(12) United States Patent
Wong

(10) Patent No.: US 6,295,562 B1
(45) Date of Patent: Sep. 25, 2001

(54) SYSTEM AND METHOD FOR PROGRAMMING A HARDWARE DEVICE

(75) Inventor: William C. Wong, Cerritos, CA (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/217,384

(22) Filed: Dec. 21, 1998

(51) Int. Cl.[7] .................................................. G06F 3/00
(52) U.S. Cl. ................................................. 710/5; 712/400
(58) Field of Search ..................................... 710/5, 33, 35; 711/157, 211

(56) References Cited

U.S. PATENT DOCUMENTS

| | | | | |
|---|---|---|---|---|
| 4,354,232 | * | 10/1982 | Ryan ..................................... | 364/200 |
| 4,811,388 | * | 3/1989 | Westerhof et al. ................... | 379/229 |
| 6,049,842 | * | 4/2000 | Garrett et al. ........................ | 710/33 |
| 6,131,146 | * | 10/2000 | Aono ..................................... | 711/157 |
| 6,141,739 | * | 10/2000 | Provence et al. ..................... | 711/211 |

* cited by examiner

Primary Examiner—Bipin Shalwala
Assistant Examiner—Nitin Patel
(74) Attorney, Agent, or Firm—Jenkens & Gilchrist, P.C.

(57) ABSTRACT

A programmable hardware device having a simplified command set is disclosed. The hardware device includes at least one function block circuit and control circuitry for controlling the operation thereof. Upon receiving a command for the function block circuit to perform a single operation, the control circuitry includes one or more state machines for generating a sequential series of sub-operational commands. The sub-operational commands are sequentially applied to the function block circuit to perform a series of sub-operational steps. The execution of the sub-operational steps results in the function block circuit performing the operation indicated by the received single command. Consequently, the application of a specific sequence of sub-operational commands to the hardware device in order to perform a single functional operation is avoided.

22 Claims, 2 Drawing Sheets

SYSTEM AND METHOD FOR PROGRAMMING A HARDWARE DEVICE

BACKGROUND OF THE INVENTION

1. Technical Field of the Invention

The present invention relates generally to programming firmware, and particularly to an improved device and method for programming hardware circuitry.

2. Background and Objects of the Invention

Conventional firmware architecture includes a programmable hardware device and a device driver corresponding thereto. The conventional programmable hardware device may include at least one function block and circuitry for programming and/or controlling the function block. A function block comprises circuitry which performs a certain (and oftentimes standard) function. For example, a function block may comprise a first-in, first-out memory (FIFO), a direct memory access (DMA) controller, a transmitter or a receiver. A number of function blocks may be combined to form higher-level devices such as a universal asynchronous receiver-transmitter (UART) or a high-level data link control (HDLC) device. The programmable hardware device typically includes suitable input-output (I/O) bussing for controlling the operation thereof.

The device driver for conventional firmware architecture contains code which is based upon the specific hardware device with which the device driver is associated. The hardware dependent code presents firmware developers with a daunting task in programming a hardware device to perform in a specific application.

First, the hardware developer must be thoroughly familiar with the hardware device and its operation in order to control it properly. Because conventional programmable hardware devices may be quite complex, a considerable period of time is typically required before the firmware developer is sufficiently familiar with the device.

Additionally, in order to program and/or control a conventional programmable hardware device to perform a single operation, the hardware device typically must be programmed to execute a number of individual sub-operations or steps. These sub-operational steps typically must be performed in an exact sequence in order for the hardware device to function properly. As a result, the programming of a programmable hardware device is often a tedious and time consuming process.

Another shortcoming in programming conventional programmable hardware devices is that of portability. The hardware specific code for one hardware device cannot be utilized in operating a different hardware device. Consequently, the above-described learning and programming processes must be repeated whenever the programmable hardware device is changed. Accordingly, there is a need for a device for simplifying the programming of programmable hardware devices.

It is an object of the present invention to provide a programmable hardware device having a simplified command set.

Another object of the present invention is to provide such a device which substantially shortens the programming cycle therefor.

It is another object of the present invention to provide a programmable hardware device which is configurable to accept both conventional and simplified methods for programming the hardware device.

SUMMARY OF THE INVENTION

The present invention overcomes the shortcomings in existing programmable hardware devices and satisfies a significant need for a user-friendly programmable hardware device for use in virtually any system.

According to a preferred embodiment of the present invention, there is provided a programmable hardware device including one or more function blocks, input/output (I/O) bussing for accessing the hardware device, a bank registers for facilitating the operation of the function blocks, and control logic for loading the register bank. Instead of accepting a sequential series of sub-operational commands which, when combined, cause the hardware device to carry out a single operation, the hardware device preferably accepts a single command for carrying out the operation. The control logic preferably includes at least one state machine which accepts a single command for performing a single operation and sequentially loads the register bank with the individual sub-operational commands corresponding thereto so that the function blocks perform the necessary sub-operations for suitably executing the single operation. By submitting operation-level commands to the hardware device instead of sub-operational commands thereto, programming code becomes highly simplified and portable. The amount of time necessary to program the hardware device is substantially reduced.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown. This invention may, however, be embodied in many different forms and should not be construed as being limited to the provided so that this disclosure will be thorough and complete, and will fully convey the scope of the invention to those skilled in the art.

Figure 1:
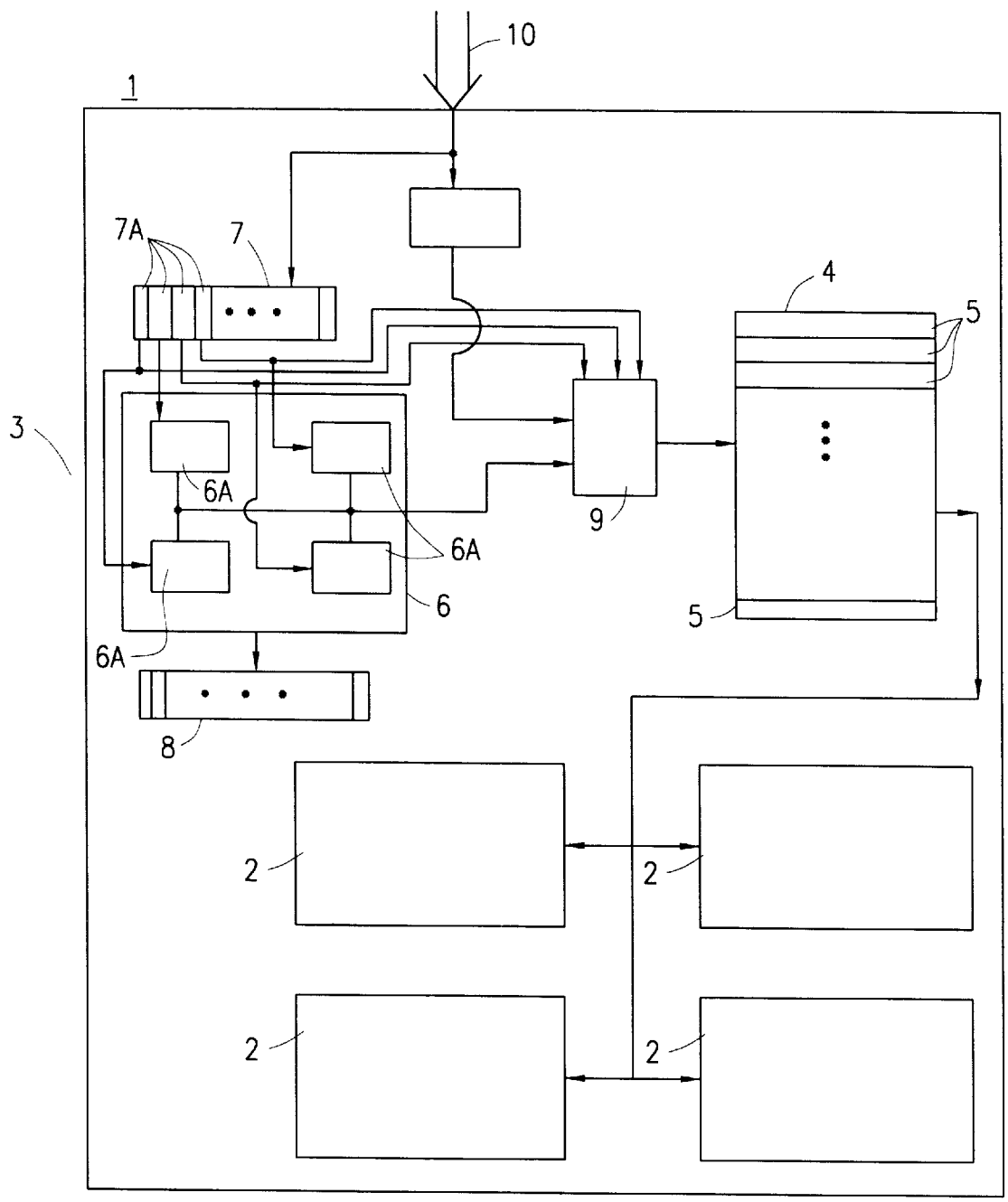
FIG. 1 is a block diagram of a programmable hardware device according to the present invention.

Referring to FIG. 1, there is shown a block diagram of a programmable hardware device 1 according to the present invention. Hardware device 1 preferably includes one or more function block circuits 2, each of which performs one or more functions. For instance, a function block circuit 2 may preferably include circuitry for transmitting or receiving an HDLC protocol data, error check circuitry, a FIFO, a DMA controller circuitry, etc. The above-identified function block circuits 2 are listed for exemplary purposes only and it is understood that a function block circuit 2 may perform virtually any function. Function block circuits 2 may be coupled to I/O bussing 10.

Hardware device 1 is preferably programmable by being capable of receiving a command from an external source (not shown) and suitably controlling one or more function block circuits 2 to perform an operation based upon the received command. Function block circuits 2 are preferably controlled and/or enabled for execution of an operation by control circuitry 3. Control circuitry 3 preferably communicates with external devices (not shown) via I/O bus 10, which may preferably include bussing for communicating data, address and suitable control signals.

Control circuitry 3 preferably includes logic for receiving a series sub-operational commands from an external device and presenting the series of sub-operational commands to the appropriate function block circuits 2 within hardware device 1. By receiving the sub-operational commands and applying a particular sequence thereof to function block circuits 2, a single functional operation is carried out.

To this end, control circuitry 3 preferably includes a bank 4 of registers 5 for maintaining the sub-operational commands for application to function block circuits 2. As stated above, sub-operational commands are preferably received by hardware device 1 and at least partially decoded for loading into the appropriate registers 5 of register bank 4.

Each register 5 of register bank 4 is preferably assigned and/or dedicated to a specific function block circuit 2 or portion thereof. Further, a function block circuit 2 may preferably have a number of registers 5 coupled thereto. When a series of sub-operational commands is received by hardware device 1 for execution by one or more particular function block circuits 2, each sub-operational command is sequentially loaded into a separate register 5. Once a sub-operational command is loaded into a register 5 of register bank 4, the sub-operational command is available to the one or more function block circuits 2 for execution of a sub-operational step.

The present invention preferably also allows hardware device 1 to be programmed by application of operational commands thereto. Specifically, the present invention is capable of receiving a single, higher level operational command for function block circuits 2 to perform a single operation. In this way, a firmware developer is no longer required to provide a specific sequence of sub-operational commands in order to effectuate a single operation by function block circuits 2.

Accordingly, hardware device 1 preferably includes circuitry for receiving a single command for execution of a single operation, and sequentially generating a corresponding series of sub-operational commands for loading into register bank 4. The circuitry for receiving a single operational command and generating a sequence of corresponding sub-operational commands preferably includes state machine circuitry 6. State machine circuitry 6 is preferably coupled to I/O bus 10 for receiving operational commands and necessary control signals therefrom. The operational commands and corresponding control signals preferably enable state machine circuitry 6 to cycle through one or more state machine states. At each state, state machine circuitry 6 preferably generates a sub-operational command for loading into a selected register 5 of register bank 4. In this way, a sequence of sub-operational commands is generated and loadable into register bank 4 upon application of a single operational command to state machine circuitry 6.

In a preferred embodiment of the present invention, state machine circuitry 6 includes a number of individual state machines 6A, with each individual state machine 6A corresponding to a distinct operation. This preferred implementation allows each individual state machine 6A to be optimized solely to generate sub-operational commands for a single operation. Because each operation may differ in complexity from other operations, individual state machines 6A may have different sizes and/or cycle through a different number of states in order to generate all of the respective sub-operational commands.

It is understood that state machine circuitry 6 may be implemented as a single state machine, a plurality of nested state machines, or another circuit for generating one or more sub-operational commands based upon the reception of a single operational command.

Control circuitry 3 of hardware device 1 preferably further includes a command register 7 for controlling, among other circuitry, state machine circuitry 6. Command register 7 preferably receives commands from I/O bus 10 and presents the commands to state machine circuitry 6. Individual register bits 7A of command register 7 are preferably coupled to distinct individual state machines 6A so as to enable the corresponding individual state machine 6A. In a preferred embodiment of the present invention, command register 7 is loaded with data to enable only one individual state machine 6A at a time.

Hardware device 1 preferably includes a status register 8 which is coupled to I/O bus 10 and to each individual state machine 6A of state machine circuitry 6. Status register 8 preferably indicates the status of state machines 6A. For instance, status register 8 may include a register bit for each individual state machine 6A. The register bits of status register 8 are preferably normally in a first logic state, either logic high or logic low. Then, when an enabled state machine 6A has cycled through all of its states, the enable state machine 6A places its corresponding register bit of status register 8 in a second logic state being the logical complement of the first logic state. Due to status register 8 being coupled to I/O bus 10, the placement of a register bit of status register 8 in the second logic state communicates to external devices that the loading of the sub-operational commands corresponding to a received operational command is complete.

By including state machine circuitry 6 within hardware device 1 as described above, hardware device 1 is capable of executing an operation upon receiving a single command without requiring a function block circuit 2 to be modified from its existing form. The creation of hardware device 1 according to the present invention thus may be relatively quickly created.

Another advantage of providing state machine circuitry 6 within hardware device 1 is that hardware device 1 may be selectively configured to receive both sub-operational commands and an operational command for effectuating a single operation. Specifically, control circuitry 3 preferably includes switching circuitry 9 for coupling register bank 4 either to state machine circuitry 6 or I/O bus 10 for receiving sub-operational commands to load therein. Switching circuitry 9 may preferably include multiplexing circuitry.

The state of register bits 7A preferably selects which element, a command field in I/O bus 10 or state machine circuitry 6, to be coupled to register bank 4 for loading sub-operational commands therein. Switching circuitry 9 further includes decoding circuitry for directing the selectively coupled sub-operational commands to the appropriate registers 5 within register bank 4.

Figure 2:
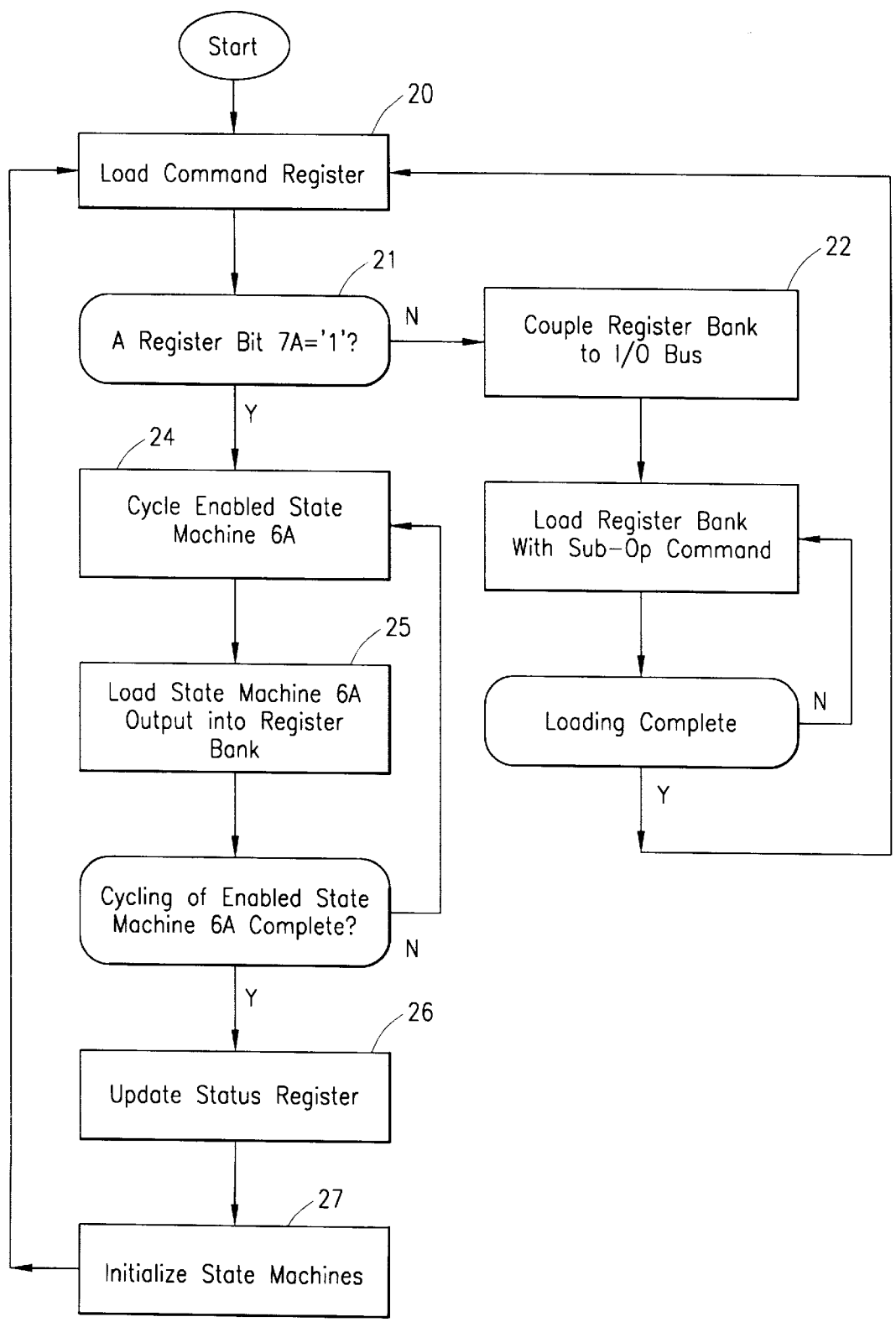
FIG. 2 is a flow chart illustrating the operation of the programmable hardware device.

The operation of hardware device 1 will be described with reference to FIG. 2. At step 20, command register 7 is loaded with data from I/O bus 10. Next, the state of register bits 7A is examined at step 21. If every register bit 7A stores a logic low value, for example, then switching circuitry 9 couples I/O bus 10 directly to registers 5 of register bank 4 at step 22. Sub-operational commands are thereafter sequentially loaded into register bank 4. As each sub-operational command is loaded into register bank 4, the sub-operational command is applied to one or more function block circuits 2 so as to cause function block circuits 2 to perform a sub-operation or step.

In the event a register bit 7A stores a logic high value, then the state machine 6A corresponding to the register bit 7A having the stored logic high value is enabled. Next, the enabled state machine 6A cycles through its states during steps 24 and 25. For each state, the enabled state machine 6A generates a sub-operational command for loading into register bank 4. As each sub-operational command is loaded into register bank 4, the sub-operational command is applied to function block circuits 2 so as to cause function block circuits 2 to perform a sub-operation or step. When the enabled state machine 6A has cycled through all of its states, the appropriate register bit in status register 8 is set or reset at step 26 to indicate completion of the functional operation. Thereafter, state machines 6A are initialized at step 27 for receiving a new set of data. Command register 7 may be initialized by the programmer or automatically due to status register 8 being updated in step 26.

Although the preferred embodiment of the system and method of the present invention have been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

What is claimed is:

1. A hardware device, comprising:
   at least one function block circuit for performing a specific set of operations; and
   control circuitry for controlling the function block to perform one or more operations, comprising:
      a first circuit for receiving a single operational command for the function block circuit to perform a single operation and for generating one or more first commands from the single operational command, each first command corresponding to a sub-operational step for execution by the function block circuit and not included in the single operational command, a series of the sub-operational steps corresponding to the generated first commands forming the single operation; and
      a bank of one or more registers coupled to the function block circuit, individual registers in the register bank being individually loadable with the first commands generated by the first circuit, an output of the register bank being coupled to the function block circuit so as to control the function block circuit to perform the single operation corresponding to the received operational command.

2. The hardware device of claim 1, further including:
   a second circuit for receiving first commands from an external source and selectively directly loading the first commands into the register bank; and
   selection circuitry for selecting for connection to the register bank first commands from one of the first circuit and the second circuit.

3. The hardware device of claim 1, wherein:
   the first circuit comprises sequential logic for generating the one or more first commands in response to the received operational command.

4. The hardware device of claim 3, wherein:
   the first circuit comprises at least one state machine, wherein the state machine generates a distinct first command for loading into the register bank for each state thereof, a sequence of states of the state machine generates the first commands for loading into the register bank.

5. The hardware device of claim 3, wherein:
   the function block circuit is capable of performing a number of different operations, each operation being identified by a distinct operational command; and
   the first circuit comprises a plurality of state machines, each state machine corresponding to a distinct operational command.

6. The hardware device of claim 5, wherein:
   each state machine of the first circuit is individually enabled.

7. The hardware device of claim 5, wherein:
   each state machine of the first circuit is selectively enabled upon receipt of a corresponding operational command from a device external to the hardware device.

8. The hardware device of claim 3, wherein:
   the function block circuit is capable of performing a number of different operations, each operation being identified by a distinct operational command; and
   the hardware device further includes a plurality of state machines and an enablement circuit for enabling one of the state machines in response to receiving an operational command.

9. A hardware device, comprising:
   at least one function block circuit for performing a specific set of operations; and
   a first circuit for receiving an operational command for the function block circuit to perform a first operation and for generating, in response to the received operational command, a sequence of a plurality of sub-operational commands for controlling the function block circuit to perform a sequence of sub-operational steps, each sub-operational command corresponding to a sub-operational step, the sequence of sub-operational steps forming the first operation of the function block circuit.

10. The hardware device of claim 9, further including:
    a second circuit for receiving the sub-operational commands from an external source, and for selectively applying the sub-operational commands received by the external source to the function block circuit to perform the sequence of sub-operational steps.

11. A hardware device comprising:
    at least one function block circuit for performing a specific set of operations;
    a first circuit for receiving an operational command for the function block circuit to perform a first operation and for generating, in response to the received operational command, a sequence of a plurality of sub-operational commands for controlling the function block circuit to perform a sequence of sub-operational steps each sub-operational command corresponding to a sub-operational step the sequence of sub-operational steps forming the first operation of the function block circuit;
    a second circuit for receiving the sub-operational commands from an external source and for selectively applying the sub-operational commands received by the external source to the function block circuit to perform the sequence of sub-operational steps; and
    switching circuitry for selecting between the sub-operational commands generated by the first circuit or the sub-operational commands provided by the second circuit, for application to the function block circuit.

12. The hardware device of claim 11, further including:
    at least one register for receiving the selected sub-operational commands from the switching circuit, the function block circuit being driven by an output of the register.

13. The hardware device of claim 9, further including:

a bank of one or more registers for receiving the sub-operational commands from the first circuit, the function block circuit being driven by an output of the register bank.

14. The hardware device of claim 13, further including:

a plurality of function block circuits; and wherein individual registers of the register bank are coupled to distinct function block circuits.

15. The hardware device of claim 9, wherein:

the first circuit comprises at least one state machine.

16. A hardware device, comprising:

at least one function block circuit for performing a specific set of operations; and a first circuit for receiving an operational command for the function block circuit to perform a first operation and for generating, in response to the received operational command, a sequence of a plurality of sub-operational commands for controlling the function block circuit to perform a sequence of sub-operational steps, each sub-operational command corresponding to a sub-operational step, the sequence of sub-operational steps forming the first operation of the function block circuit, the first circuit comprises at least one state machine, the state machine is enabled for cycling through each state thereof and for generating one of the plurality of sub-operational commands when in each cycled state.

17. The hardware device of claim 9, wherein:

the first circuit is capable of receiving one of a plurality of operational commands for the function block circuit to perform a plurality of respective first operations, the first circuit comprising a plurality of state machines, each state machine corresponding to a distinct operational command.

18. The hardware device of claim 17, further including:

a circuit for enabling one of the plurality of state machines in response to a received operational command.

19. A method of controlling a hardware device having at least one function block circuit which is capable of performing a set of operations, the method comprising the steps of:

receiving an operational command corresponding to an operation from the set of operations;

generating a plurality of sub-operational commands based upon the received operational command, each sub-operational command corresponding to a sub-operation of the function block circuit; and sequentially applying the sub-operational commands to the function block circuit to perform a sequential series of the respective sub-operations, the sequential series of sub-operations forming the operation corresponding to the received operational command.

20. The method of claim 19, wherein:

the generating step sequentially generates the plurality of sub-operational commands.

21. The method of claim 19, further including the steps of:

receiving a plurality of sub-operational commands from an external source; and selecting between the sub-operational commands received from the external source and the sub-operational commands generated during the generating step;

wherein the applying step applies the sub-operational commands selected during the selecting step to the function block circuit.

22. The method of claim 19, further including the step of:

indicating a completion of the applying step.

\* \* \* \* \*

UNITED STATES PATENT AND TRADEMARK OFFICE
CERTIFICATE OF CORRECTION

PATENT NO.    : 6,295,562 B1
DATED         : September 25, 2001
INVENTOR(S)   : William C. Wong It is certified that error appears in the above-identified patent and that said Letters Patent is hereby corrected as shown below:

Column 2,
Line 42, after "as being limited to the" insert -- embodiment set forth herein. Rather, the embodiment is --

Column 6,
Line 43, after "device" insert -- , --.
Line 52, after "steps" insert -- , --.
Line 53, after "step" insert -- , --.

Signed and Sealed this

Twentieth Day of August, 2002

Attest:

Attesting Officer

JAMES E. ROGAN
Director of the United States Patent and Trademark Office